United States Patent
Seewald et al.

(10) Patent No.: US 9,958,210 B2
(45) Date of Patent: May 1, 2018

(54) HEAT EXCHANGER

(71) Applicant: BEHR GMBH & CO. KG, Stuttgart (DE)

(72) Inventors: Wolfgang Seewald, Tamm (DE); Falk Viehrig, Sindelfingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 261 days.

(21) Appl. No.: 14/369,104

(22) PCT Filed: Dec. 21, 2012

(86) PCT No.: PCT/EP2012/076858
§ 371 (c)(1),
(2) Date: Jun. 26, 2014

(87) PCT Pub. No.: WO2013/098276
PCT Pub. Date: Jul. 4, 2013

(65) Prior Publication Data
US 2014/0374074 A1  Dec. 25, 2014

(30) Foreign Application Priority Data

Dec. 30, 2011  (DE) ........................ 10 2011 090 188

(51) Int. Cl.
*F28D 1/03*  (2006.01)
*F28D 1/04*  (2006.01)
(Continued)

(52) U.S. Cl.
CPC ......... *F28D 1/0341* (2013.01); *F28D 1/0333* (2013.01); *F28D 1/0435* (2013.01);
(Continued)

(58) Field of Classification Search
CPC .... F28D 1/0341; F28D 1/0333; F28D 1/0435; F28D 1/05383; F28D 1/0426; F28D 20/02; F28D 9/00062
(Continued)

(56) References Cited

U.S. PATENT DOCUMENTS 3,258,832 A * 7/1966 Gerstung ............... B21D 53/04
165/148
3,292,690 A * 12/1966 Donaldson ............ F28D 1/0333
165/152
(Continued)

FOREIGN PATENT DOCUMENTS

DE  19 08 800 A   1/1970
DE  35 36 325 A1  5/1986
(Continued)

OTHER PUBLICATIONS

International Search Report, PCT/EP2012/076858, dated May 14, 2013, 3 pgs.
(Continued)

*Primary Examiner* — Grant Moubry
*Assistant Examiner* — Raheena R Malik
(74) *Attorney, Agent, or Firm* — Paul D. Strain, Esq.; Strain & Strain PLLC

(57) ABSTRACT

The invention relates to a plate-type heat exchanger, in particular for motor vehicles, having a plurality of plate pairs for forming first, second and third flow paths, a spatial region for fourth flow paths being formed between adjacent plate pairs, the plate pairs being formed from at least one first plate and a second plate in order to form the first flow paths and the second flow paths between the first and second plates, the third flow paths also being formed between the first plate and the second plate or an attachment plate being placed upon the first and/or the second plate in order to form (Continued)

the third flow path between the first plate and the attachment plate and/or between the second plate and the attachment plate.

11 Claims, 5 Drawing Sheets

(51) Int. Cl.
*F28D 20/02* (2006.01)
*F28D 1/053* (2006.01)
*F28D 21/00* (2006.01)
*F28D 20/00* (2006.01)

(52) U.S. Cl.
CPC ......... *F28D 1/05383* (2013.01); *F28D 20/02* (2013.01); *F28D 2020/0013* (2013.01); *F28D 2021/0085* (2013.01); *Y02E 60/145* (2013.01)

(58) Field of Classification Search
USPC .................................................. 165/153, 166
See application file for complete search history.

(56) References Cited

U.S. PATENT DOCUMENTS

| | | | | |
|---|---|---|---|---|
| 3,631,923 | A * | 1/1972 | Izeki | F28B 1/02 165/167 |
| 4,327,802 | A * | 5/1982 | Beldam | F28D 1/0333 165/153 |
| 4,712,612 | A | 12/1987 | Okamoto et al. | |
| 5,024,269 | A * | 6/1991 | Noguchi | F28D 1/0341 165/153 |
| 5,137,082 | A * | 8/1992 | Shimoya | F25B 39/022 165/110 |
| 5,503,223 | A * | 4/1996 | Choi | F28D 1/0341 165/153 |
| 5,507,338 | A * | 4/1996 | Schornhorst | F28D 1/0333 165/153 |
| 5,855,240 | A * | 1/1999 | Farrell | F28D 1/0341 165/152 |
| 5,937,935 | A * | 8/1999 | Schornhorst | B21D 53/04 165/153 |
| 6,269,869 | B1 * | 8/2001 | Tavi | F28D 1/0333 165/153 |
| 6,438,840 | B2 * | 8/2002 | Tavi | F28D 1/0333 29/890.03 |
| 6,854,513 | B2 | 2/2005 | Shirota et al. | |
| 6,973,804 | B2 * | 12/2005 | Horiuchi | F25B 39/022 165/110 |
| 8,495,894 | B2 | 7/2013 | Kerler et al. | |
| 2002/0124999 | A1 * | 9/2002 | Chiba | F28D 1/0333 165/153 |
| 2002/0195237 | A1 * | 12/2002 | Luz | F28D 9/0043 165/153 |
| 2004/0011514 | A1 * | 1/2004 | Holm | F28D 9/005 165/166 |
| 2005/0144978 | A1 * | 7/2005 | Papapanu | F28D 1/0333 62/515 |
| 2006/0266501 | A1 | 11/2006 | So et al. | |
| 2007/0039714 | A1 * | 2/2007 | Loup | B60H 1/005 165/43 |
| 2007/0295026 | A1 * | 12/2007 | Mori | F25B 39/022 62/515 |
| 2009/0120624 | A1 * | 5/2009 | Lim | F28D 1/0333 165/158 |
| 2014/0352936 | A1 | 12/2014 | Neumann | |

FOREIGN PATENT DOCUMENTS

| | | |
|---|---|---|
| DE | 101 24 757 A1 | 11/2001 |
| DE | 10 2006 028 017 A1 | 8/2007 |
| DE | 10 2008 045 845 A1 | 3/2010 |
| FR | 2 866 947 A1 | 9/2005 |
| FR | 2 918 166 A1 | 1/2009 |
| JP | S62-293086 A | 12/1987 |
| JP | H11-153395 A | 6/1999 |
| JP | 2000-205777 A | 7/2000 |
| KR | 2007-0067848 A | 6/2007 |
| WO | WO 2006/059005 A1 | 6/2006 |
| WO | WO 2010/150774 A1 | 12/2010 |

OTHER PUBLICATIONS

German Search Report, DE 10 2011 090 188.4, dated Aug. 6, 2012, 5 pgs.
German Search Report, DE 10 2011 090 176.0, dated Aug. 8, 2012, 5 pgs.
International Search Report, PCT/EP2012/076852, dated Mar. 28, 2013, 2 pgs.
Neumann, U.S. PTO Office Action, U.S. Appl. No. 14/369,057, dated May 16, 2016, 9 pgs.
Neumann, U.S. PTO Office Action, U.S. Appl. No. 14/369,057, dated Nov. 16, 2016, 11 pgs.
Neumann, U.S. PTO Advisory Action, U.S. Appl. No. 14/369,057, dated Jan. 9, 2017, 5 pgs.
Neumann, U.S. PTO Office Action, U.S. Appl. No. 14/369,057, dated Mar. 7, 2017, 7 pgs.
Neumann, U.S. PTO Notice of Allowance, U.S. Appl. No. 14/369,057, dated Aug. 16, 2017, 8 pgs.

* cited by examiner

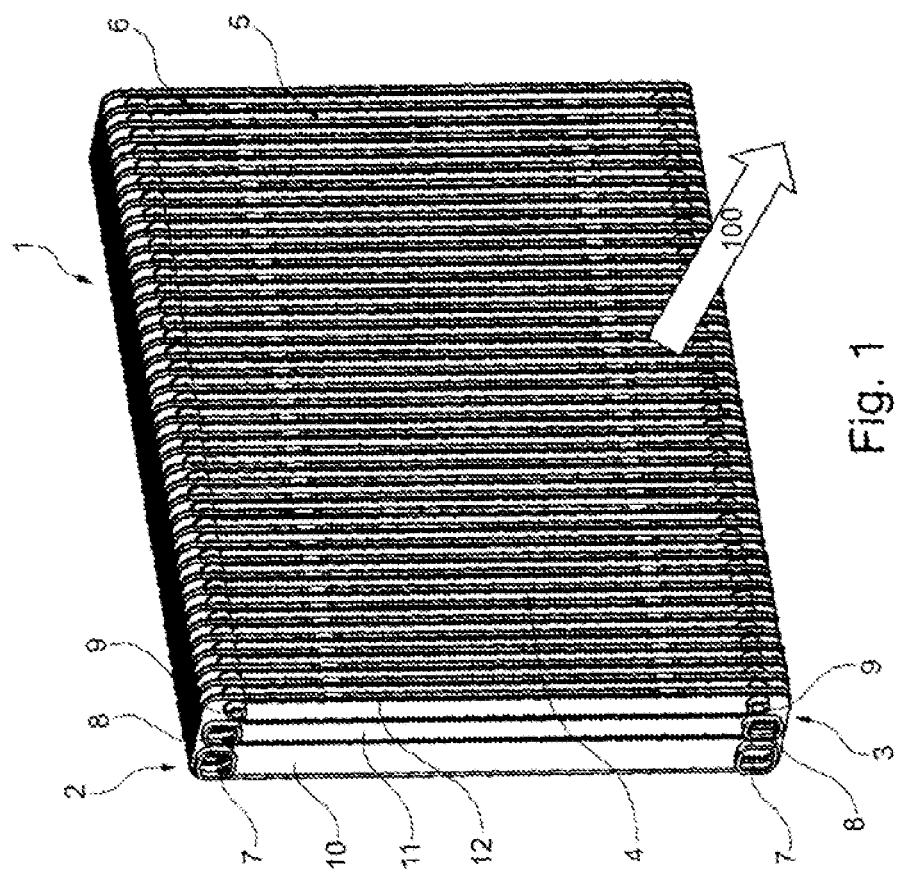
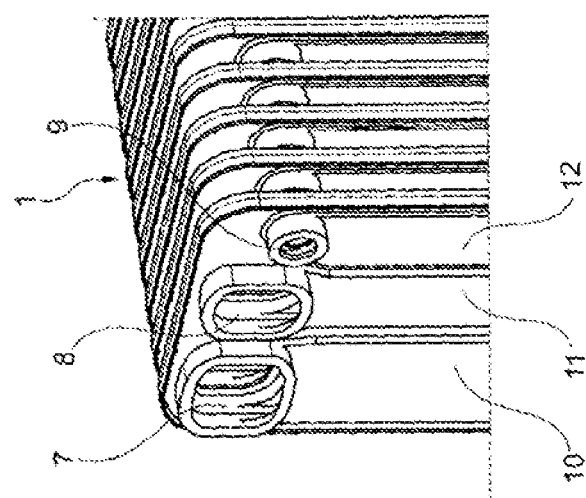

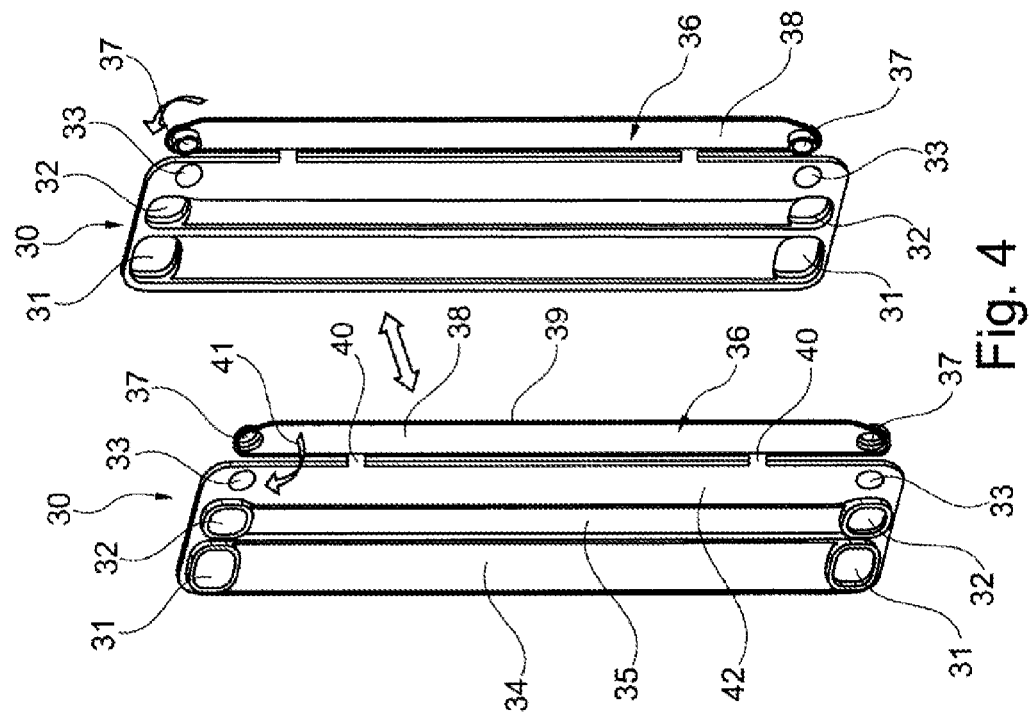
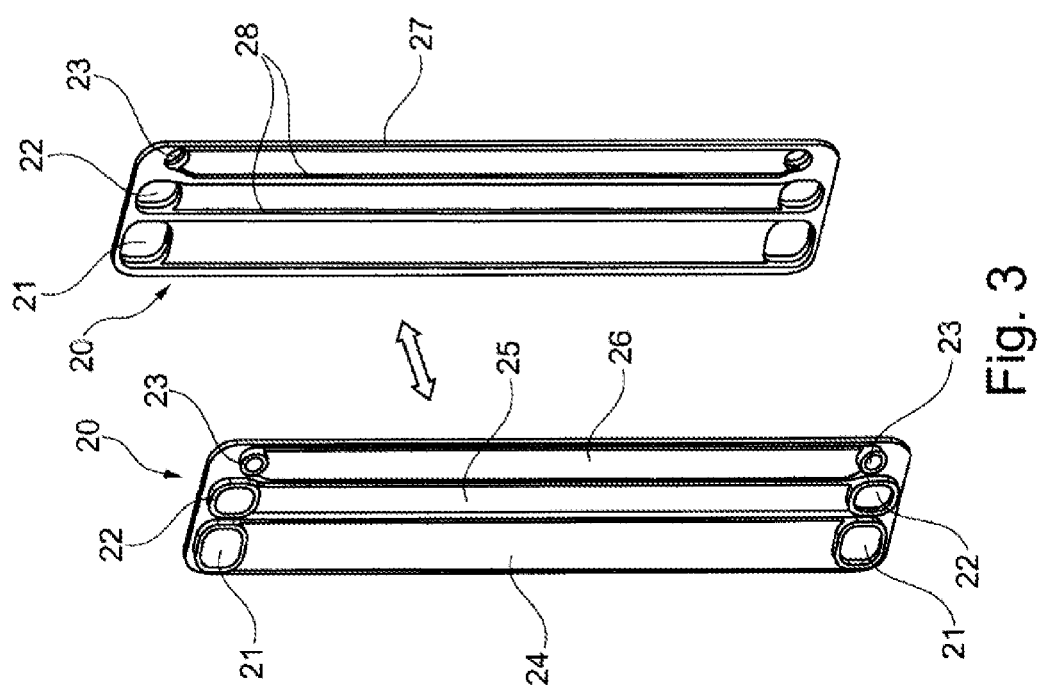
Fig. 4
Fig. 3

Fig. 7
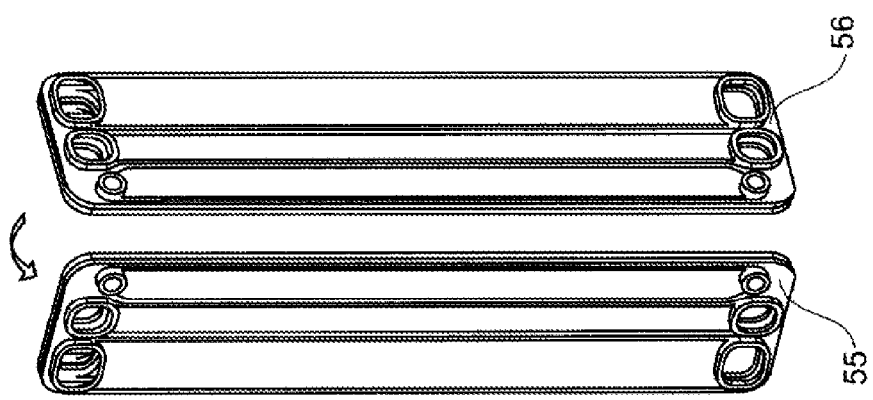
Fig. 6
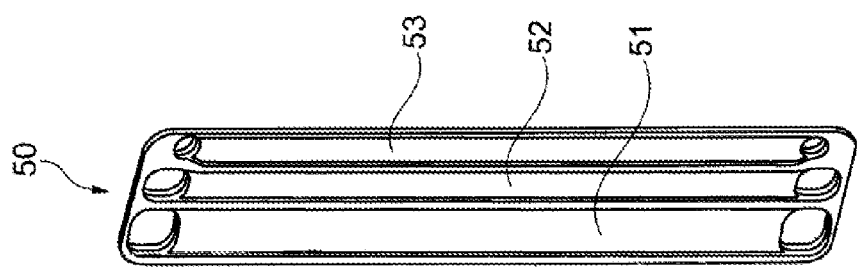
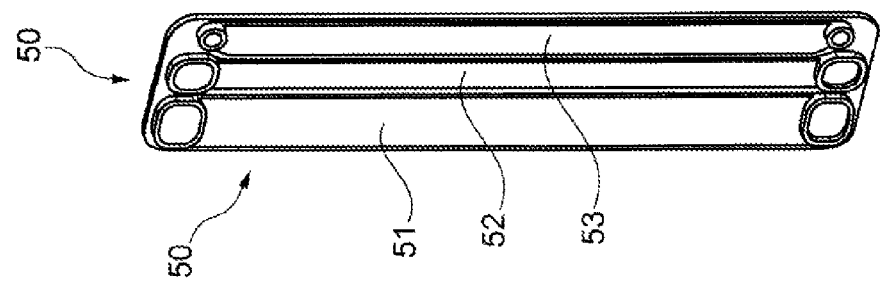
Fig. 5

HEAT EXCHANGER

CROSS-REFERENCE TO RELATED PATENT APPLICATIONS

This application is a National Stage of International Application No. PCT/EP2012/076858, filed Dec. 21, 2012, which is based upon and claims the benefit of priority from prior German Patent Application No. 10 2011 090 188.4, filed Dec. 30, 2011, the entire contents of all of which are incorporated herein by reference in their entirety.

TECHNICAL FIELD

The invention relates to a plate-type heat exchanger, in particular for motor vehicles, having a multiplicity of plate groups in order to form first and second and third flow paths, wherein a space region for fourth flow paths is formed between adjacent plate groups.

PRIOR ART

Heat exchangers are provided in motor vehicles in high numbers and for a very wide variety of purposes. For instance, evaporators are used in air conditioning systems, in order to cool the air which flows through flow paths through the evaporator by way of evaporation of the refrigerant in flow paths in the evaporator, in order in this way to bring about air conditioning and dehumidifying in the motor vehicle interior. To this end, flat tube evaporators or plate-type evaporators have been disclosed.

In motor vehicles, the essential trend in recent times has been that the fuel consumption of a motor vehicle and the associated $CO_2$ emissions are to be reduced. This is also achieved in motor vehicles having an internal combustion engine by virtue of the fact that, at a temporary standstill, for example caused by stopping of the vehicle at a traffic light or comparable situations, the internal combustion engine of the vehicle is switched off. As soon as the vehicle is activated again for driving off by way of actuation of the accelerator or the clutch pedal, the internal combustion engine is switched on again in an automated manner. This technology is also called the start-stop method. Start-stop methods of this type have already been implemented in low-consumption motor vehicles. For the customary motor vehicle air conditioning systems on the market with a refrigerant circuit in accordance with the cold vapor process, the compressor of the refrigerant circuit is as a rule driven via a belt drive which is driven by the motor vehicle drive engine. The result when the engine is at a standstill is that the air conditioning system can then no longer be called a system which operates so as to produce a refrigeration effect when the compressor drive is at a standstill. When the engine is switched off in start-stop operation, the climate control of the motor vehicle can then no longer operate and provide refrigeration performance for cooling the motor vehicle interior. As a consequence of this situation, the evaporator of the air conditioning system warms up relatively rapidly and the air which flows through the evaporator is cooled only slightly or too little. This causes firstly the vehicle interior temperature to rise and the comfort of the vehicle occupants to be impaired.

In a motor vehicle air conditioning system, a dehumidifying process also takes place in addition to the reduction in temperature, since the humidity which is present in the air condenses on the evaporator and exits the vehicle through a condensate outlet. The air which flows through the evaporator is thus dehumidified and enters the motor vehicle interior in a dehumidified state. During active start-stop operation, this also causes the dehumidification of the air which enters the motor vehicle interior to no longer be able to be ensured sufficiently, with the result that the air humidity in the vehicle interior rises during active start-stop operation. This also leads to a rise in air humidity which is perceived to be unpleasant and uncomfortable by the vehicle occupants.

In order to avoid or to slow down these processes which increase the temperature and air humidity, what is known as the accumulator-type evaporator has been developed which, in addition to the actual evaporator function, also comprises a cold accumulator medium which extracts heat from the air which flows through the evaporator during active start-stop operation and continues to cool and dehumidify said air. Said accumulator-type evaporators have been disclosed, for example, by DE 102006028017. Here, the accumulator-type evaporator which is disclosed in said document consists of two separate heat exchanger blocks, the evaporator and the accumulator part, which are produced in different production processes and are connected to one another only shortly before the brazing process and are subsequently brazed jointly to produce one unit. Here, the main evaporator consists of two flat tube rows which are arranged one behind another in the air direction, and the accumulator part is connected downstream of said two flat tube rows in the air direction. Here, the accumulator part consists of double tube rows, in which two tubes are plugged inside one another, the refrigerant flowing through in the interior of the inner tube and the cold accumulator medium being arranged in the intermediate space between the outer tube and the inner tube. The production process in this regard proves complicated and expensive, since a large quantity of different parts have to be adapted, joined and calibrated with respect to one another, in order for it to be possible to produce a functional heat exchanger. In particular, the double tube with concealed tube inlets proves to be relatively complex, the number of parts is very high with, at the same time, a high number of different parts, and the maintenance of the tolerances proves risky for the process capability on account of the multiplicity of components. This conversely means there is an increased risk of leaks, with the result that, in addition to the parts costs, the rejection rates are also subject to the risk of being increased.

SUMMARY OF THE INVENTION, PROBLEM, SOLUTION, ADVANTAGES

It is the problem of the invention to provide a heat exchanger which can be produced simply and causes lower costs than the heat exchangers which are known in the prior art, with simultaneously reduced complexity and a reduced rejection rate.

This is achieved by way of a heat exchanger having the features of claim 1, according to which a plate-type heat exchanger is produced, in particular for motor vehicles, having a multiplicity of plate pairs in order to form first, second and third flow paths, wherein a space region for fourth flow paths is formed between adjacent plate pairs, the plate pairs are formed from at least a first plate and a second plate in order to form the first flow paths and the second flow paths between the first and the second plate, wherein the third flow paths are likewise formed between the first plate and the second plate or an attachment plate is placed onto the first and/or the second plate in order to form the third flow path between the first plate and the attachment plate and/or between the second plate and the attachment plate. As a result, a plate pair can be produced simply, in which only one die is necessary which produces an identical plate which is then used for the formation of the ducts.

It is advantageous here if the plate and/or the attachment plate have/has openings and/or cups as port and connecting regions and have/has duct-forming structures, such as embossments, in order to form flow paths between port regions.

It is also expedient if the first plate and the second plate of the plate group have in each case three port regions on two opposite end regions as inlet and/or outlet of the first, the second and the third flow path, and at least in each case one duct-forming structure is provided between in each case two port regions in order to form the first and the second flow path.

It is also expedient if the first plate and the second plate have a duct-forming structure between in each case two port regions in order to form the third flow path.

Furthermore, it is expedient if the first plate and the second plate have a region which can be provided with an attachment plate in order to form a duct-forming structure between in each case two port regions in order to form the third flow path.

It is also expedient if the duct-forming structures are embossed into the first plate and/or into the second plate and/or into the attachment plate as a projecting duct.

It is advantageous if the attachment plate is formed in one piece with the first plate and/or with the second plate.

It is also expedient if the attachment plate is produced together with the first or the second plate and can then be placed by being bent over onto a planar region of the first or second plate.

Furthermore, it is expedient if the attachment plate is formed separately from the first plate or from the second plate you can be placed onto a planar region of the first or second plate.

Further advantageous refinements are described by the following description of the figures and by the subclaims.

BRIEF DESCRIPTION OF THE DRAWINGS

In the following text, the invention will be explained in greater detail on the basis of at least one exemplary embodiment using the drawings, in which:

FIG. 1 shows a first exemplary embodiment of a heat exchanger according to the invention, FIG. 2 shows a view of an enlarged detail according to FIG. 1, FIG. 3 shows a view of a plate arrangement of a heat exchanger, FIG. 4 shows a view of a plate arrangement of a heat exchanger, FIG. 5 shows a view of a plate arrangement of a heat exchanger, FIG. 6 shows a view of a plate arrangement of a heat exchanger, FIG. 7 shows a view of a plate arrangement of a heat exchanger.

PREFERRED EMBODIMENT OF THE INVENTION

Figure 10:
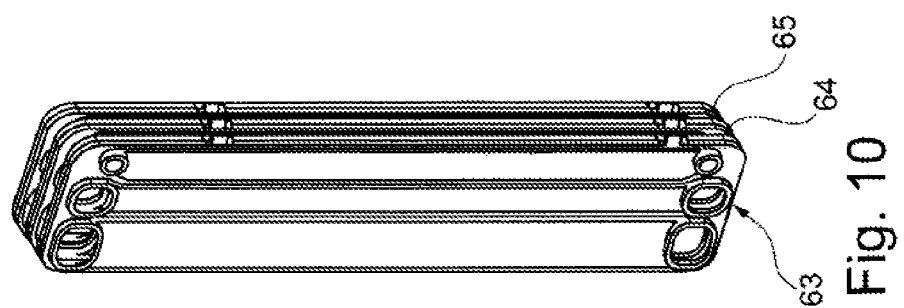
FIG. 10 shows a view of a plate arrangement of a heat exchanger.

FIG. 1 shows a heat exchanger 1 which has a first upper collector 2 and a second lower collector 3 which are arranged on opposite sides of the heat exchanger and which extend in each case in the transverse direction of the heat exchanger. Here, the collectors 2, 3 are formed by continuous openings in plate pairs which are arranged in rows next to one another and are connected to one another in a fluid-tight manner. Here, the collectors 2, 3 are connected to a block 4 which is arranged between the two collectors 2, 3, and in which the network of the block is formed from plates which are joined together to form plate pairs 5, wherein a multiplicity of plate pairs 5 are arranged next to one another, in order to form the network of the heat exchanger 1. Space regions 6 which serve for the throughflow, for example, of air through the heat exchanger are provided between two in each case adjacent plate pairs 5. The air direction for the throughflow of the heat exchanger through the space regions 6 is indicated by 100, see the arrow in this regard in FIG. 1. Ribs, such as corrugated ribs, can advantageously also be provided in said space regions 6, in order to improve the heat transfer between the plate pairs and the air.

As can be seen in FIG. 1, the upper collector and the lower collector return to substantially three flow ducts which are characterized or indicated by the three port stubs 7, 8, 9. The flow ducts are, as it were, an extension of the port stubs which are identified by the designations 7, 8, 9 and extend in the transverse direction of the heat exchanger 1.

Furthermore, flow ducts are provided between the collectors, which flow ducts extend in each case between one of the collectors and are divided into first, second and third flow ducts 10, 11, 12. The flow ducts 10 are formed between the port regions 7, lying opposite one another, and extend between them, the flow ducts 11 are formed between the port regions 8, lying opposite one another, and extend between them, and the flow ducts 12 are formed between the port regions 9, lying opposite one another, and extend between them.

FIG. 2 shows a detailed illustration once again of an upper detail of the heat exchanger 1 with the port regions 7, 8, 9 which are arranged as cups in the plates of the plate pairs and which, in the case of plate pairs which bear against one another with contact, are arranged in such a way that they protrude on both sides out of the plane of the plate or the plate pair and, in the case of adjacent plate pairs, the port stubs are in contact with one another, with the result that they can be brazed to one another and sealed. Furthermore, the flow ducts 10, 11, 12 can be seen which, starting from the respective port region 7, 8, 9, extend in the perpendicular direction to the adjacent port region, wherein the adjacent port region cannot be seen in FIG. 2.

It can be seen, furthermore, that the cross-sectional area of the port regions 7, 8 is considerably greater than that of the port region 9 of the flow ducts 12.

FIG. 3 shows one exemplary embodiment of a plate pair 20 which has a design, in which three ports or cups which are denoted by 21, 22, 23 are provided for connection at the respective end regions which lie opposite one another.

Between said ports, flow ducts 24, 25, 26 are provided which are embossed into the metal sheet as duct-forming structures and extend between the respective pairs of port regions 21, 22, 23. It can be seen, furthermore, that the plate has a circumferential edge 27, and webs 28 which separate the flow ducts from one another are provided between the flow ducts. If two plates of this type are placed onto one another and brazed to one another, this results in a plate pair, in which in each case cups which lie opposite one another and protrude perpendicularly with respect to the plate plane are formed on both sides at the end regions, wherein in each case three flow ducts 24, 25, 26 are provided between the two plates, for the throughflow of the plate between the respective port regions.

FIG. 4 shows an alternative embodiment in this regard of a plate pair 30, in which once again port regions 31, 32, 33 are provided at the two upper end regions, wherein the port regions 31 and 32 are configured as cups which protrude out of the plane of the plate. Flow ducts 34, 35 which can conduct a fluid between the respective cups as flow ducts are once again provided between said two cups 31, 32. In contrast, the port regions 33 are configured merely as openings in the planar plate, and no flow duct is made, such as embossed, in the plate between said openings either. Furthermore, the plate also has an attachment plate 36, however, which, at its two end regions, has openings with cups 37 which serve to introduce a fluid. Furthermore, the attachment plate is configured such that it is based on a flow duct 38, and is provided with a circumferential edge 39. Said attachment plate is connected at the regions 40 to the plate 30, such as is configured in one piece, in particular. If the attachment plate 36 is then folded onto the plate, as indicated by the arrow 41, the attachment plate is placed with its circumferential edge 39 onto the planar region 42 of the plate 30 and thus forms a flow duct.

If two plates of the type from FIG. 4 are then placed onto one another and the attachment plates in this regard are folded onto the plate and brazed to one another, this in turn results in a plate pair with three flow ducts which have in each case one port region at their two ends which lie opposite one another which are configured by cups.

FIG. 5 shows an arrangement of two plates 50 which are configured in accordance with the plate from FIG. 3 and are provided with in each case three port regions, such as preferably cups, which are arranged at the end regions of the plates on the top and the bottom, wherein in each case one flow duct 51, 52, 53 is provided between said cups, with the result that, in the case of a connection and brazing of two identical plates, a plate pair with three flow ducts is provided, which flow ducts are provided at the two end regions in each case with three cups which serve to introduce and discharge the refrigerant and which, furthermore, come into contact with adjacent plates for connecting said adjacent plates, in order to be connected to one another in a fluid-tight manner there.

FIG. 6 shows two plate pairs of this type according to FIG. 5 which are once again stacked and connected to one another, with the result that the plate pair 55 and the plate pair 56 are once again connected to one another. In addition, FIG. 7 shows an arrangement of three plate pairs 55, 56, 57 which can be used during assembly as a detail of a heat exchanger according to FIG. 1.

Figure 9:
FIG. 9 shows a view of a plate arrangement of a heat exchanger.
Figure 8:
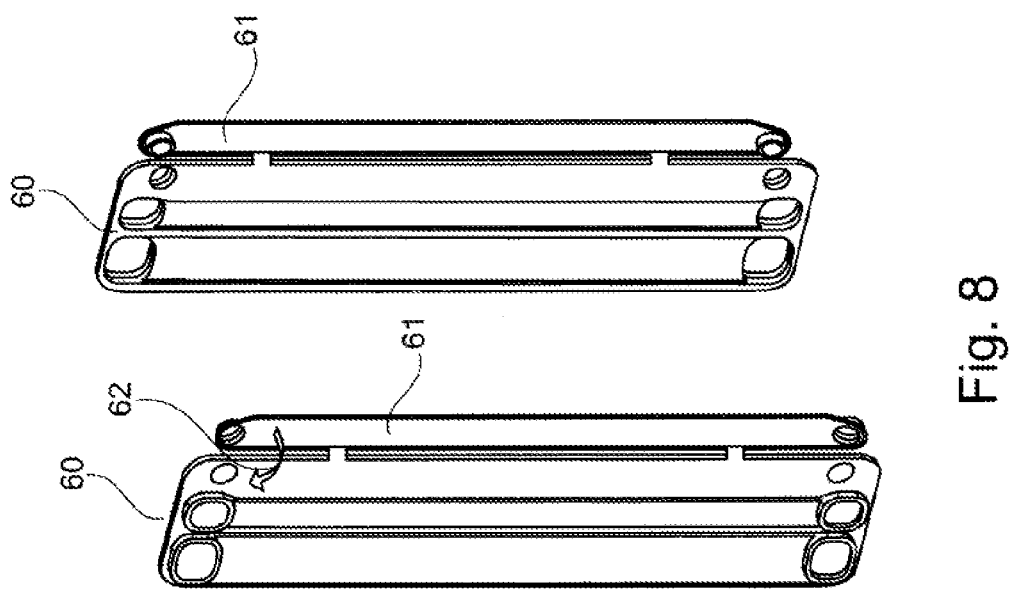
FIG. 8 shows a view of a plate arrangement of a heat exchanger.

FIGS. 8 to 10 show substantially the same assembly scheme according to FIGS. 5 to 7, wherein a plate pair in accordance with FIG. 4 is used in FIGS. 8 to 10.

This means that a plate 60 with the attachment plate 61 is first of all processed to produce a plate with three fluid ducts, by the attachment plate 60 being folded onto the plate 60 according to the arrow 62, wherein this takes place in two plate pairs, so that the plates which result therefrom can be connected to one another, by the planar surfaces being placed onto one another, in order to be brazed to one another later.

FIG. 9 shows the arrangement of plate pairs 62 of this type, wherein FIG. 10 shows the stacking of three plate pairs 63, 64, 65 of this type, wherein said stacking can in turn be used as a basis for a heat exchanger according to FIG. 1.

Figure 11:
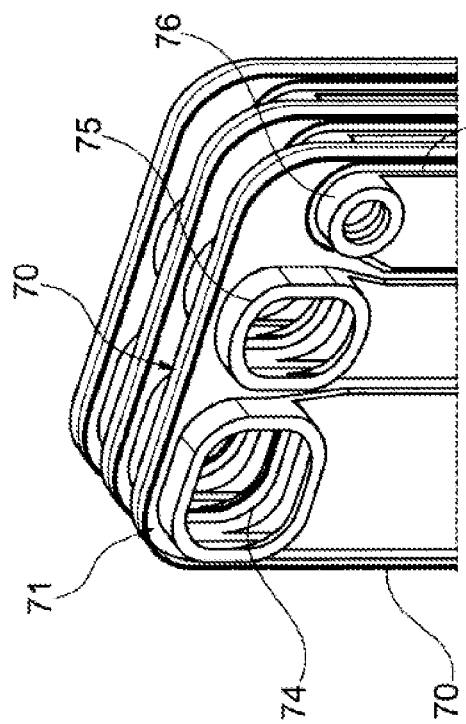
FIG. 11 shows a view of a plate arrangement of a heat exchanger in a detailed view.

FIGS. 11 to 14 show the view of a heat exchanger according to the examples of FIGS. 5 to 7 and 8 to 10, wherein it can be seen in FIG. 11 that the plate 70 of the plate pair 71 is stacked with a second plate 70 to form a plate pair, wherein the attachment plate 73 can be seen on the front side of the plate 70. Said attachment plate 73 has a circumferential edge for brazing to the plate 70, with the result that FIG. 11 corresponds to an exemplary embodiment from FIGS. 8 to 10. It can be seen that the cups 74, 75, 76 in each case have a different design and in each case have a different diameter, wherein the cups 74 and 75 are of approximately rectangular and oval configuration, respectively, and the cup 76 is of round configuration and is considerably smaller than the cups 74 and 75.

Figure 12:
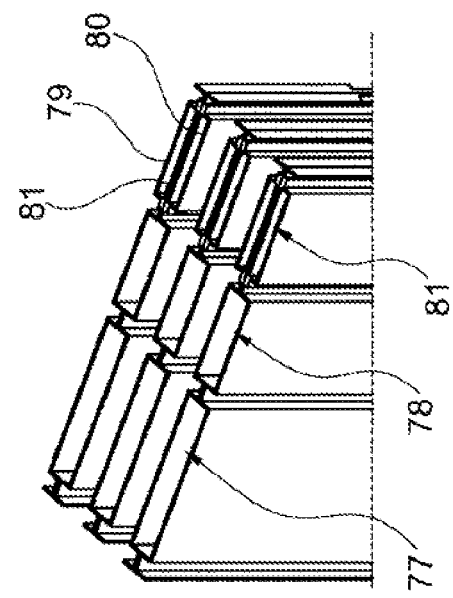
FIG. 12 shows a view of a plate arrangement of a heat exchanger in a sectional illustration.
Figure 14:
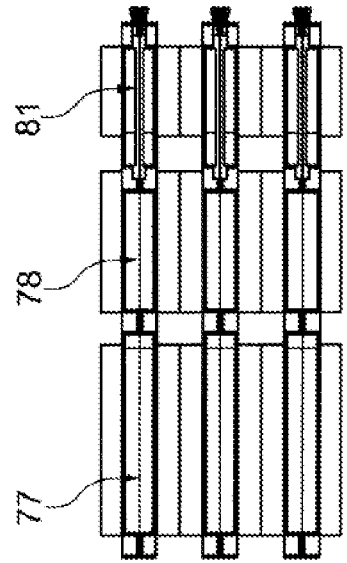
FIG. 14 shows a view of a plate arrangement of a heat exchanger in a sectional illustration.

FIG. 12 shows a section through a plate pair of this type according to FIG. 11, wherein the fluid ducts which belong to the cups 74 and 75 are denoted by 77 and 78 in the figure, wherein the fluid ducts which can be flowed into through the port 76 are split in two and are provided with the designations 79, 80. It can be seen that said fluid ducts have a central wall 81 which is the wall which corresponds to the planar region 42 in FIG. 4. Since said wall 42 additionally also occurs in a double-sided manner in a plate pair, the wall 81 in FIG. 12 is likewise of double-walled configuration. This can also be seen in FIG. 14. The flow ducts 77 and 78 do not have a central wall of this type because merely one embossment is performed in the plate 30 in relation to said flow ducts, with the result that there is no central wall there, but rather only a side wall of the flow duct.

Figure 13:
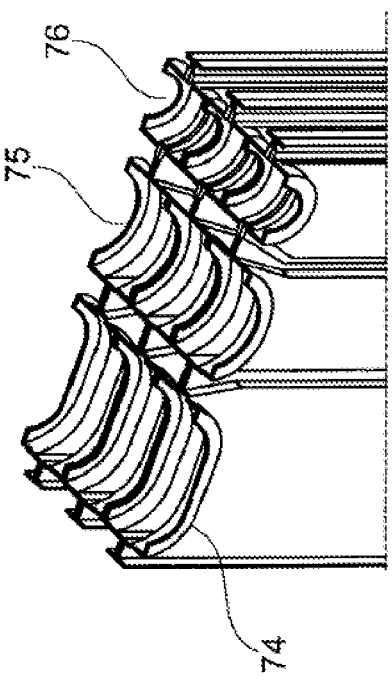
FIG. 13 shows a view of a plate arrangement of a heat exchanger in a sectional illustration.

FIG. 13 shows a section through the plate assembly according to FIG. 11, wherein the section is made at the level of the cups 74, 75, 76, with the result that it can be seen that the width of the cups in the region of the ports is identical for each cup in the transverse direction of the heat exchanger and there is a web between the cups, which web brings about a division of the fluid ducts between the cups.

The exemplary embodiments according to FIGS. 1 to 14 therefore show a plate-type heat exchanger, in which a multiplicity of plate pairs are provided in order to form first, second and third flow paths. The plate pairs are formed by first and second plates which in each case provide embossments or ducts in order to form the first and second flow paths between said two plates, wherein, in a first exemplary embodiment of FIGS. 3 and 5 to 7, the third flow ducts are also produced by embossments or ducts in the plates, wherein, in a further exemplary embodiment according to FIGS. 4 and 8 to 10, the ducts are produced by the attachment of an attachment plate onto the plate, in which merely the first and second flow paths are made. Here, the attachment plate is placed onto a substantially planar region of the plate and is brazed to the plate in such a way that a flow duct is produced which is fluid-tight per se.

LIST OF DESIGNATIONS

1 Heat exchanger
2 Collector

3 Collector
4 Block
5 Plate pair
6 Space region
7 Port stub
8 Port stub
9 Port stub
10 Flow duct
11 Flow duct
12 Flow duct
20 Plate pair
21 Port
22 Port
23 Port
24 Flow duct
25 Flow duct
26 Flow duct
27 Circumferential edge
28 Web
30 Plate pair
31 Port region
32 Port region
33 Port region
34 Flow duct
35 Flow duct
36 Attachment plate
37 Cup
38 Flow duct
39 Edge
40 Region
41 Arrow
42 Region
50 Plate
51 Flow duct
52 Flow duct
53 Flow duct
55 Plate pair
56 Plate pair
57 Plate pair
60 Plate
61 Attachment plate
62 Arrow
63 Plate pair
64 Plate pair
65 Plate pair
70 Plate
71 Plate pair
73 Attachment plate
74 Port, cup
75 Port, cup
76 Port, cup
77 Flow duct
78 Flow duct
79 Flow duct
80 Flow duct
81 Wall
100 Air direction

The invention claimed is:

1. A heat exchanger comprising:
a plurality of plate pairs arranged in a block, wherein each plate pair comprises a first flow path, a second flow path, a third flow path, and a fourth flow path, wherein each flow path is isolated from one another,
wherein each plate pair comprises a first plate and a second plate,
wherein the first flow path and the second flow path are each formed between the first and the second plate, wherein the first plate and the second plate bound the first flow path and the second flow path, wherein the third flow path is formed
(a) between an attachment plate connected to an edge region of the first plate and the first plate, wherein the attachment plate and the first plate bound the third flow path, wherein the attachment plate is not connected to the second plate, or
(b) between an attachment plate connected to an edge region of the second plate and the second plate, wherein the attachment plate and the second plate bound the third flow path, wherein the attachment plate is not connected to the first plate,
wherein the attachment plate does not bound the first flow path or the second flow path,
wherein the fourth flow path is formed between two adjacent plate pairs.

2. The heat exchanger as claimed in claim 1,
wherein the first plate and the second plate of each plate pair have a first end region comprising first, second, and third port regions that are isolated from each other and a second end region comprising fourth, fifth, and sixth port regions that are isolated from each other,
wherein the first flow path extends between the first port region and the fourth port region, wherein the second flow path extends between the second port region and the fifth port region, and wherein the third flow path extends between the third port region and the sixth port region.

3. The heat exchanger as claimed in claim 2,
wherein the first plate, the second plate, and the attachment plate each have openings and/or cups comprising the port regions and have duct-forming structures for forming flow paths between port regions.

4. The heat exchanger as claimed in claim 3,
wherein the duct-forming structures are embossed into the first plate and/or into the second plate and/or into the attachment plate as a projecting duct.

5. The heat exchanger as claimed in claim 1,
wherein the attachment plate is formed in one piece with the first plate and/or with the second plate.

6. The heat exchanger as claimed in claim 5,
wherein the attachment plate is produced in a single piece planar construction together with the first plate and is connected to an edge region of the first plate, wherein in an assembled state the attachment plate is bent approximately 180 degrees along a vertical axis connecting the attachment plate and the first plate such that the attachment plate abuts the first plate, or
wherein the attachment plate is produced in a single piece planar construction together with the second plate and is connected to an edge region of the second plate, wherein in an assembled state the attachment plate is bent approximately 180 degrees along a vertical axis connecting the attachment plate and the second plate such that the attachment plate abuts the second plate.

7. The heat exchanger as claimed in claim 1,
wherein the attachment plate is formed separately from the first plate or from the second plate, wherein in an assembled state the attachment plate is placed onto the first plate or the second plate such that the attachment plate abuts the first plate or the second plate.

8. The heat exchanger as claimed in claim 3, wherein the attachment plate has at least one cup.

9. The heat exchanger as claimed in claim 1,
wherein the first plate, the second plate, and the attachment plate each comprise a plate having four edges, a front face, and a rear face, wherein the front face or rear face is embossed to form at least a portion of a duct, wherein one of the four edges of the attachment plate is connected to one of the four edges of the first plate or of the second plate.

10. The heat exchanger as claimed in claim 1, wherein the first flow path, the second flow path, the third flow path, and the fourth flow path are isolated from one another along the entire space bounded by the plate pair.

11. A heat exchanger comprising:

a plurality of plate pairs arranged in a block, wherein each plate pair comprises a first flow path, a second flow path, a third flow path, and a fourth flow path, wherein each flow path is isolated from one another along an entire space bounded by the plate pair, wherein each plate pair comprises a first plate and a second plate, wherein the first flow path and the second flow path are each formed between the first and the second plate, wherein the first plate and the second plate bound the first flow path and the second flow path, wherein the third flow path is formed (a) between an attachment plate connected to an edge region of the first plate and the first plate, wherein the attachment plate and the first plate bound the third flow path, wherein the attachment plate is not connected to the second plate, or (b) between an attachment plate connected to an edge region of the second plate and the second plate, wherein the attachment plate and the second plate bound the third flow path, wherein the attachment plate is not connected to the first plate, wherein the attachment plate does not bound the first flow path or the second flow path, wherein the fourth flow path is formed between two adjacent plate pairs, and wherein the first plate and the second plate of each plate pair have a first end region comprising first, second, and third port regions that are isolated from each other and a second end region comprising fourth, fifth, and sixth port regions that are isolated from each other, wherein the first flow path extends between the first port region and the fourth port region, wherein the second flow path extends between the second port region and the fifth port region, and wherein the third flow path extends between the third port region and the sixth port region, wherein the attachment plate is produced in a single piece planar construction together with the first plate and is connected to an edge region of the first plate, wherein in an assembled state the attachment plate is bent approximately 180 degrees along a vertical axis connecting the attachment plate and the first plate such that the attachment plate abuts the first plate, or the attachment plate is produced in a single piece planar construction together with the second plate and is connected to an edge region of the second plate, wherein in an assembled state the attachment plate is bent approximately 180 degrees along a vertical axis connecting the attachment plate and the second plate such that the attachment plate abuts the second plate.

* * * * *